United States Patent
Takaku et al.

(10) Patent No.: US 9,210,680 B2
(45) Date of Patent: Dec. 8, 2015

(54) METHOD AND APPARATUS FOR SELECTING A REAL TIME LOCATION SERVICE PROVIDER

(75) Inventors: Yoshitsugu Takaku, Tokyo (JP); Ryoko Hizume, Kanagawa (JP); Etsuko Nakamoto, Tokyo (JP)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 214 days.

(21) Appl. No.: 11/769,428

(22) Filed: Jun. 27, 2007

(65) Prior Publication Data

US 2009/0005062 A1 Jan. 1, 2009

(51) Int. Cl.
- *H04W 24/00* (2009.01)
- *G01D 1/02* (2006.01)
- *H04W 64/00* (2009.01)
- *G01S 19/06* (2010.01)
- *H04W 60/00* (2009.01)

(52) U.S. Cl.
CPC ............... *H04W 64/00* (2013.01); *G01S 19/06* (2013.01); *H04W 60/00* (2013.01)

(58) Field of Classification Search
USPC .............. 455/456.1, 435.1, 456.2, 456.4; 370/338
See application file for complete search history.

(56) References Cited

U.S. PATENT DOCUMENTS

| | | | |
|---|---|---|---|
| 2005/0107953 A1* | 5/2005 | Sugla | 701/300 |
| 2005/0239480 A1* | 10/2005 | Kim et al. | 455/456.1 |
| 2007/0026871 A1* | 2/2007 | Wager | 455/456.1 |
| 2007/0293215 A1* | 12/2007 | Dawson | 455/433 |

FOREIGN PATENT DOCUMENTS

| | | |
|---|---|---|
| JP | H10117207 A | 5/1998 |
| JP | 2004242274 A | 8/2004 |
| JP | 2005079819 A | 3/2005 |

OTHER PUBLICATIONS

OMA-AD-SUPL-V1_0-20070615-A—Secure User Plane Location Architecture—Open Mobile Alliance.*

* cited by examiner

*Primary Examiner* — William Nealon
(74) *Attorney, Agent, or Firm* — Morris & Kamlay LLP

(57) ABSTRACT

A method and apparatus for selecting a real time location service provider enables improved positioning services. The method includes processing a request for a position of a portable electronic device, where the request identifies at least one local access point and a connected cellular communication cell to which the device is operatively connected (step 705). The connected cellular communication cell is then matched with a listed cellular communication cell, where the listed cellular communication cell is associated with the real time location service provider and with a plurality of registered access points (step 710). Further, the at least one local access point is matched with at least one registered access point in the plurality of registered access points (step 715). Finally, the real time location service provider is selected based on an association of the at least one registered access point with the real time location service provider (step 720).

20 Claims, 7 Drawing Sheets

US 9,210,680 B2

METHOD AND APPARATUS FOR SELECTING A REAL TIME LOCATION SERVICE PROVIDER

FIELD OF THE INVENTION

The present invention relates generally to portable electronic devices, and in particular to determining a position of a portable electronic device using a real time location service provider.

BACKGROUND

Mobile telephones and other portable electronic devices increasingly include a locating feature that enables a current geographic location of a device to be either displayed on the device or transmitted to a remote receiver. These features are generally called location services (abbreviated as LCS, for "LoCation Services"). LCS features that display location coordinates on a device are useful, for example, to device users who need to know where they are located relative to geographic map coordinates. Thus LCS features can enable a device user to initiate a location request where the device acts as a Global Positioning System (GPS) terminal. Also, location requests may be initiated by third parties and transmitted to a device over a wireless network. Such third party requests are useful in various circumstances. For example, mobile telephone networks may be able to improve network efficiency and provide better Quality of Service (QoS) and roaming rates to a mobile user if the network can periodically monitor a mobile telephone location. Also, emergency services can sometimes save lives by rapidly and accurately identifying where emergency phone calls have originated. Other useful location-based services and data that can be provided through portable electronic devices include maps, weather forecasts, traffic data, and local news.

Various locating technologies can be used to determine the location of a portable electronic device. For example, the Global Positioning System (GPS) can be used to identify a location anywhere in the world of some mobile telephones. However, because most mobile telephones are already operatively connected to land-based network stations, and do not need to communicate solely with satellites, Assisted GPS (A-GPS) services are commonly used to incorporate better and more efficient location services into mobile telephones. Secure User Plane Location (SUPL) is a technology developed by the Open Mobile Alliance (OMA) that concerns the transfer of assistance data and positioning data between a portable electronic device and a location platform, and includes a family of standards. A "user plane" means that assistance data and positioning data are transmitted between the device and the location platform over a conventional wireless communication channel such as a General Packet Radio Service (GPRS) channel. User plane communications are thus distinguished from control plane communications where assistance data and positioning data are transmitted between a device and a location platform over a separate signaling channel in a network.

Other locating technologies include short-range wireless based locating technologies, also known as real time location services (RTLS), which measure parameters of a wireless local area network (WLAN), such as a received signal strength indicator (RSSI) or a time difference of arrival (TDOA) parameter. Still other locating technologies include other hybrid approaches that employ a combination of satellite based, cell based, and short-range wireless based locating technologies.

BRIEF DESCRIPTION OF THE DRAWINGS

In order that the invention may be readily understood and put into practical effect, reference will now be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Figure 1:
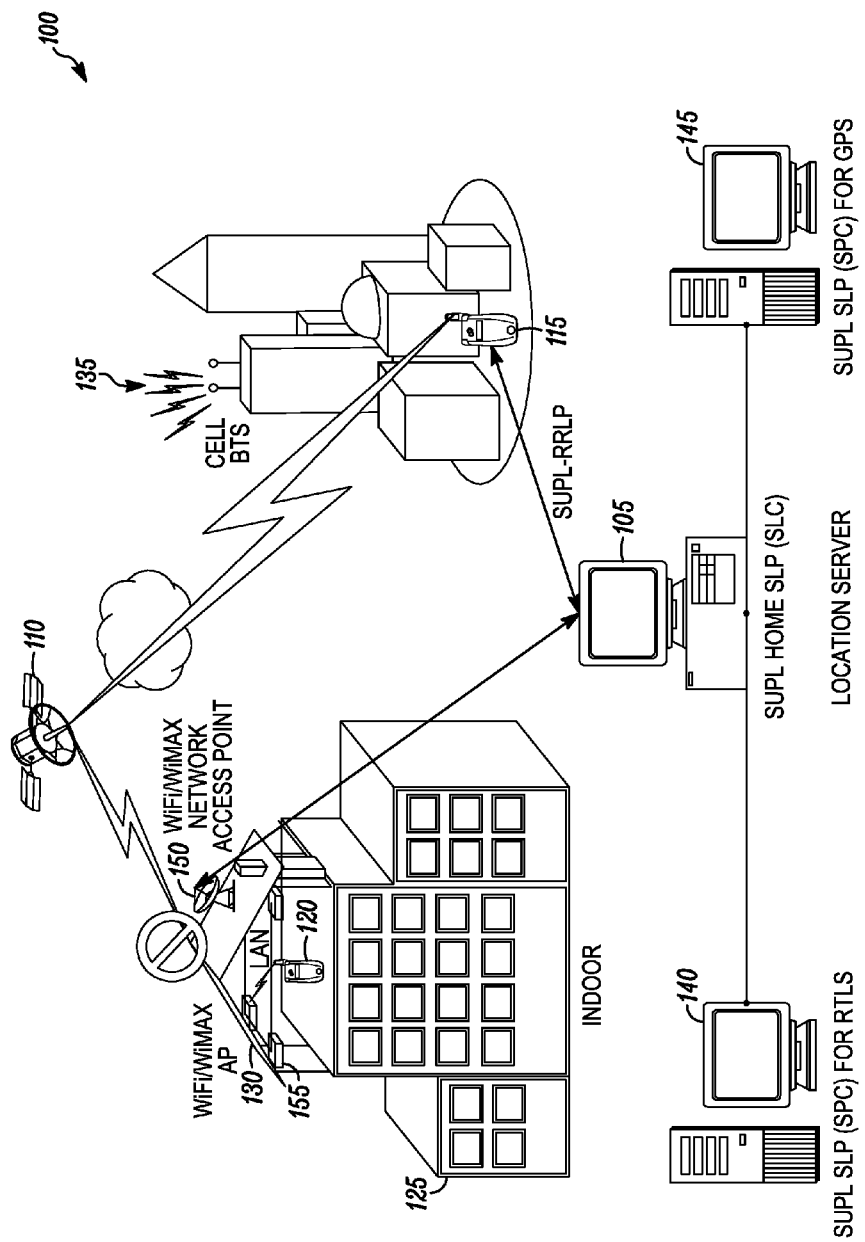
FIG. 1 is a schematic diagram illustrating a network in which a secure user plane location (SUPL) location center (SLC) interacts with various networks and devices, according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to selecting a real time location service provider. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . ." does not, without more constraints, preclude the existence of additional identical elements in the process, method, article, or apparatus that comprises the element.

According to one aspect, the present invention is a method for selecting a real time location service provider. The method includes processing a request for a position of a portable electronic device, where the request identifies at least one local access point and a connected cellular communication cell to which the device is operatively connected. The connected cellular communication cell is then matched with a listed cellular communication cell, where the listed cellular communication cell is associated with the real time location service provider and with a plurality of registered access points. Further, the at least one local access point is matched with at least one registered access point in the plurality of registered access points. Finally, the real time location service provider is selected based on an association of the at least one registered access point with the real time location service provider.

Some embodiments of the present invention therefore enable a Secure User Plane Location (SUPL) Location Center (SLC) to function as a proxy server to select an appropriate location service provider, such as a real time location services (RTLS) provider or a global positioning system (GPS) location services provider. Selection of an appropriate location service provider can be seamless from the perspective of end users, and can increase available location services (LCS) technologies and improve positioning accuracy. Further, use of a proxy server does not require portable electronic devices that move around a network to maintain internet protocol (IP) addresses and locations of individual location servers. Other specific advantages of some embodiments of the present invention are described in detail below.

Referring to FIG. 1, a schematic diagram illustrates a network 100 in which a secure user plane location (SUPL) location center (SLC) 105 interacts with various subnetworks and devices, according to some embodiments of the present invention. A GPS satellite 110 is shown in radio communication with a portable electronic device in the form of a mobile telephone 115. Another mobile telephone 120 is shown inside a building 125 and in radio communication with a wireless fidelity (WiFi)/worldwide interoperability for microwave access (WIMAX) network access point (AP) 130. Both the mobile telephones 115, 120 are also in wireless communication with a connected cellular communication cell 135 centered at a base transceiver station (BTS).

The SLC 105 is operatively connected to a SUPL positioning center (SPC) for RTLS 140 and to a SUPL positioning center (SPC) for GPS 145. The SLC 105 also can be operatively connected to additional SPCs for RTLS (not shown), where each SPC for RTLS manages data for a plurality of registered access points in the network 100. All position acquisition requests for portable electronic devices within the network 100, such as the mobile telephones 115, 120, are sent to the SLC 105. The SLC 105 then determines which SPC, such as the SPC for RTLS 140 or the SPC for GPS 145, is appropriate for processing a specific position acquisition request.

The SLC 105 can process position acquisition requests for location services (LCS) from various sources. For example, such requests can include mobile terminated location requests (MTLRs), network initiated location requests (NILRs), or mobile originated location requests (MOLRs). MTLRs are location requests that are initiated by another network user, such as other mobile stations, websites or information services. NILRs are location requests that are received from a mobile network where the network is not requesting verification or notification. Typically, NILRs are used for locating mobile stations for emergency or law-enforcement purposes. MOLRs are location requests that originate from a portable electronic device, such as when the mobile telephone 120 requests its own location.

Consider that the mobile telephone 120 transmits a MOLR to the WiFi/WIMAX AP 130, and the MOLR is relayed through another WiFi/WIMAX AP 150 to the SLC 105. The MOLR identifies at least one local access point, such as the WiFi/WIMAX AP 130, and the connected cellular communication cell 135 to which the mobile telephone 120 is operatively connected. The SLC 105 then can use the information received with the MOLR to select an appropriate location services provider, such as the SPC for GPS 145, the SPC for RTLS 140, or another SPC for RTLS in the network 100.

Further consider that the mobile telephone 120 is unable to obtain a strong signal from the satellite 110 because the mobile telephone 120 is located inside the building 125. However, RTLS positioning services remain available to the mobile telephone 120 through the WiFi/WIMAX AP 130. If RTLS positioning services of the WiFi/WIMAX AP 130 are managed by the SPC for RTLS 140, then the SLC 105 will seamlessly select the SPC for RTLS 140 to respond to the MOLR received from the mobile telephone 120. Such a seamless selection can be transparent to a user of the mobile telephone 120, so that he or she is not made aware that the MOLR is performed by an RTLS method, or that the mobile telephone 120 is out of range of the satellite 110.

According to some embodiments of the present invention, received signal strength values are used to identify a position of a portable electronic device when a real time location service provider is unable to fix a location of the portable electronic device. For example, the mobile telephone 120 will transmit additional information with its MOLR, including identifying a plurality of access points that are within radio range of the mobile telephone 120, and respective received signal strength values from each of the access points. If the mobile telephone 120 is within radio range of the WiFi/WIMAX AP 130, the WiFi/WIMAX AP 150 and a third WiFi/WIMAX AP 155, the mobile telephone 120 will include in the MOLR an identification of each WiFi/WIMAX AP 130, 150, 155, such as a medium access control (MAC) address, and a received signal strength value, such as a received signal strength indicator (RSSI) value. If each WiFi/WIMAX AP 130, 150, 155 is managed by the SPC for RTLS 140, the position of each WiFi/WIMAX AP 130, 150, 155 is known by the SPC for RTLS 140. That enables the SPC for RTLS 140 to use the MAC addresses and RSSI values received with the MOLR to estimate a position of the mobile telephone 120, even without using RTLS or GPS methods. Therefore the SPC for RTLS 140 can estimate a position of the mobile telephone 120 even if both RTLS and GPS positioning methods are unable to fix a position of the mobile telephone 120.

Although various embodiments of the present invention are described in relation to the mobile telephones 115, 120, those skilled in the art will appreciate that embodiments of the present invention can be associated with various other types of portable electronic devices, such as notebook computers, personal digital assistants (PDAs), handheld radios, vehicle location systems, and various other electronic appliances that may employ location services (LCS).

Figure 2:
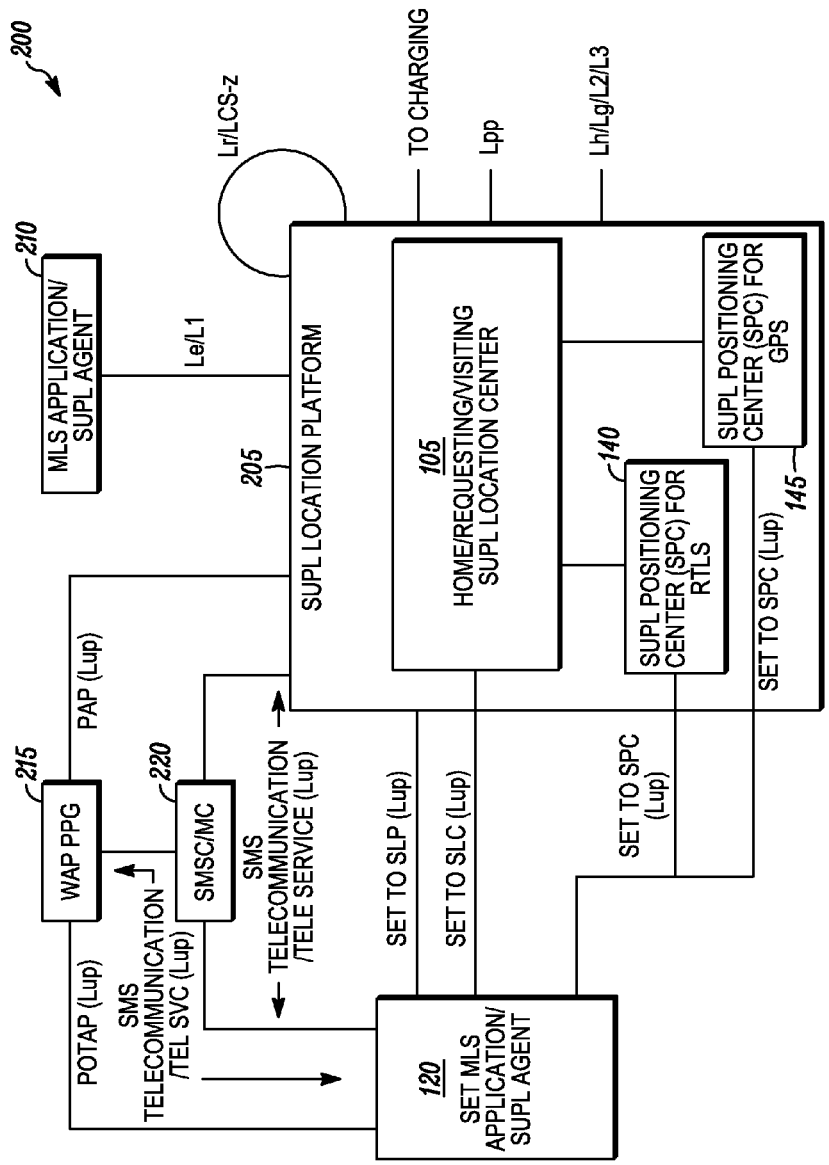
FIG. 2 is a block diagram illustrating a SUPL location platform architecture including an SLC, a SUPL positioning center (SPC) for RTLS, and an SPC for GPS, according to some embodiments of the present invention.

Referring to FIG. 2, a block diagram illustrates a SUPL location platform architecture 200 in the network 100 including the SLC 105, the SPC for RTLS 140, and the SPC for GPS 150, according to some embodiments of the present invention. The SUPL location platform architecture 200 includes a SUPL location platform (SLP) 205 that is operatively connected to a mobile location services (MLS) application/SUPL agent 210, such as a third party that requests and consumes location information. The SLP 205 is also operatively connected to a SUPL enabled terminal (SET) such as the mobile telephone 120. A wireless application protocol push proxy gateway (WAP PPG) 215 connects to the SLP 205 using a push access protocol (PAP), and connects to the mobile telephone 120 using a push over the air protocol (POTAP). A short message service center/message center (SMSC/MC) 220 is operatively connected to the SLP 205, the WAP PPG 215, and the mobile telephone 120. The SLC 105 communicates with a SET such as the mobile telephone 120 over a user plane bearer.

Figure 3:
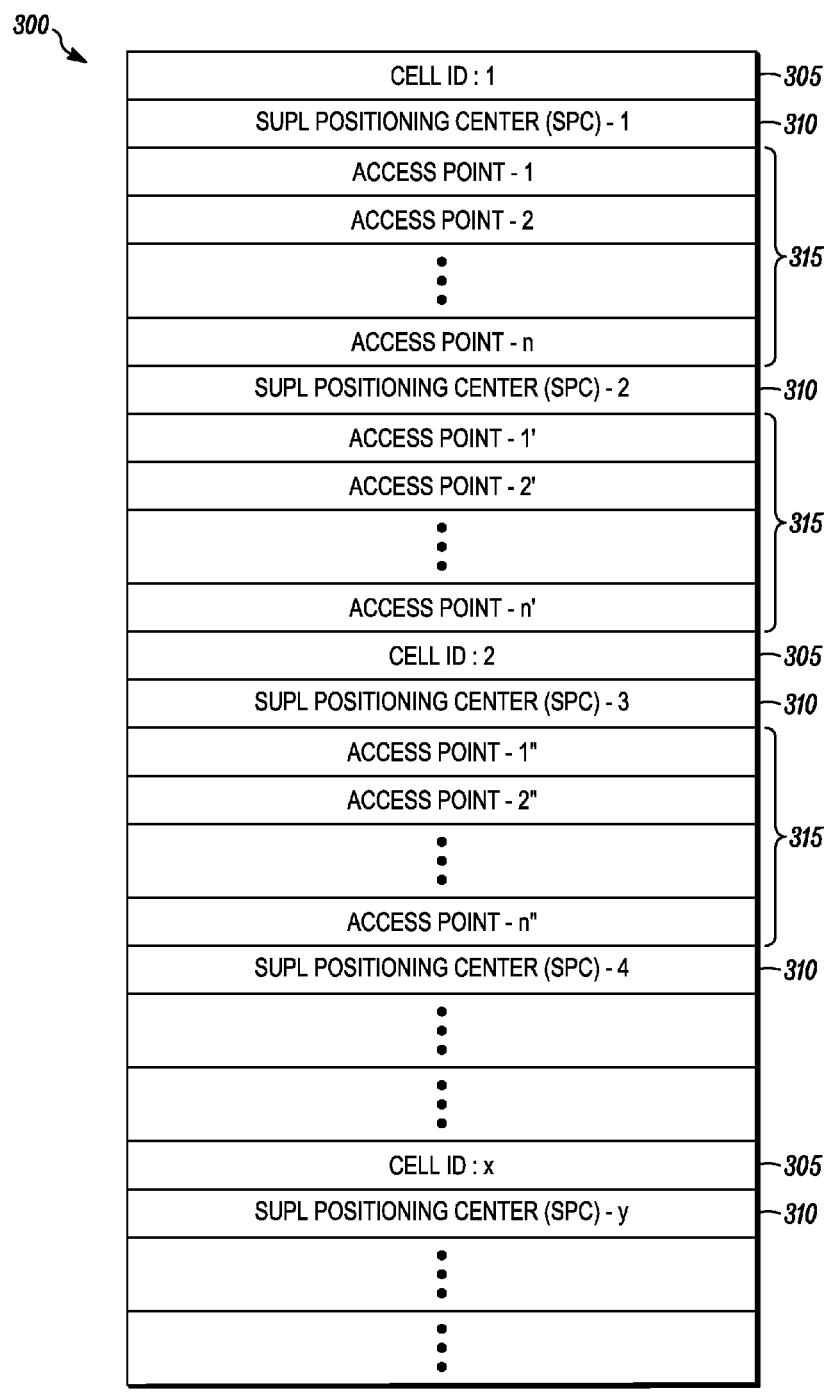
FIG. 3 is an RTLS affiliation table illustrating RTLS data that are maintained in a database of a SUPL SLC, according to some embodiments of the present invention.

Referring to FIG. 3, an RTLS affiliation table 300 illustrates RTLS data that are maintained in a database of a SUPL location center such as the SLC 105, according to some embodiments of the present invention. The table 300 includes a plurality of listed cellular communication cells 305. Each listed cellular communication cell 305 is then associated with a plurality of listed SUPL Positioning Centers (SPCs) 310, and each listed SUPL Positioning Center (SPC) 310 is associated with a plurality of registered access points 315. Each listed cellular communication cell 305 is defined by an identification such as an identification of a base transceiver station (BTS). Each listed SUPL SPC 310 is defined by an identification such as a global internet protocol (IP) address. Finally, each registered access point 315 is defined by an identification such as a medium access control (MAC) address.

The RTLS affiliation table 300 can be generated at a SUPL location center, such as at the SLC 105. For example, each time a SUPL positioning center (SPC) for RTLS, such as the SPC for RTLS 140, is powered up, the SPC sends a registration request message to the SLC 105. The registration request message identifies all access points that are managed by that SPC and provides a position of each access point. Also, if information concerning an access point changes, such as if an access point moves around or is disconnected from the network 100, an update message can be transmitted from the SPC to the SLC 105.

Figure 4:
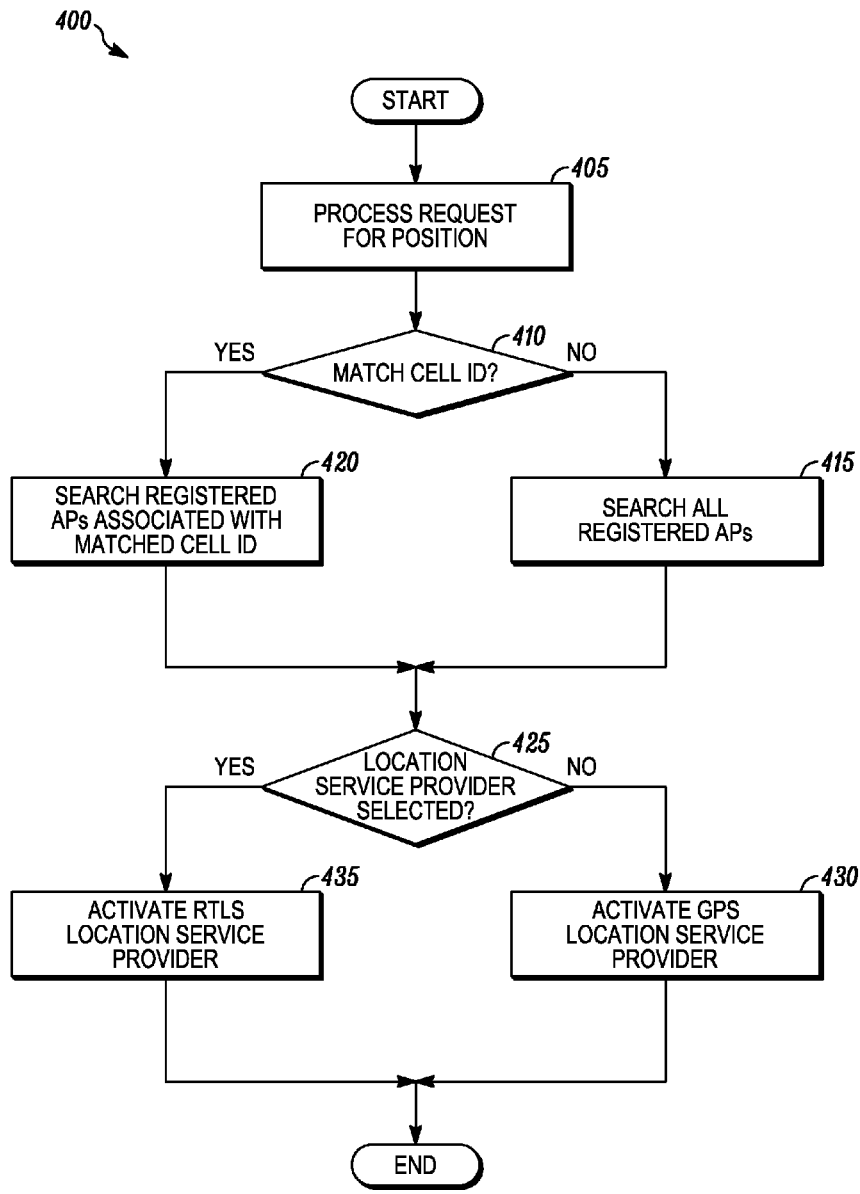
FIG. 4 is a general flow diagram illustrating a method of selecting a real time location service provider, according to some embodiments of the present invention.

Referring to FIG. 4, a general flow diagram illustrates a method 400 of selecting a real time location service provider, according to some embodiments of the present invention. At step 405, a request for a position of a portable electronic device is processed. For example, the mobile telephone 120 transmits a mobile originated location request (MOLR) to the SUPL location center (SLC) 105 through the WiFi/WIMAX access point (AP) 150. The request may identify all three of the WiFi/WIMAX APs 130, 150, 155, and include received signal strength values from each WiFi/WIMAX AP 130, 150, 155. The request may further identify the cellular communication cell 135 to which the mobile telephone 120 is operatively connected.

At step 410, it is determined whether a connected cellular communication cell to which the device may be operatively connected matches a listed cellular communication cell. For example, using the RTLS affiliation table 300, the SLC 105 determines whether an identification of the cellular communication cell 135 matches an identification of a listed cellular communication cell 305.

At step 415, if no match can be found to a listed cellular communication cell, then a search of all registered access points is performed to identify an appropriate real time location services provider. For example, if an identification of the cellular communication cell 135 is not included in the RTLS affiliation table 300, or the mobile telephone 120 is not connected to any cellular communication cell, then the SLC 105 will search all registered access points 315 in RTLS affiliation table 300 to find a match of an access point that is within radio frequency range of the mobile telephone 120, such as the WiFi/WIMAX AP 130. A SUPL SPC 310 corresponding to a matched registered access point 315 is then selected.

At step 420, if a match is found to a listed cellular communication cell, then a search of registered access points associated with the matched cellular communication cell is performed to identify an appropriate real time location services provider. For example, if the cellular communication cell 305 identified in the RTLS affiliation table 300 as "Cell ID: 2" matches an identification of the cellular communication cell 135, then a search of the plurality of registered access points identified in the RTLS affiliation table 300 as "Access Point-1"" through "Access Point-n"" is performed. There is no need to search all registered access points 315 in the RTLS affiliation table 300, and thus the search process is more efficient. A SUPL SPC 310 corresponding to a matched registered access point 315 is then selected.

At step 425, it is determined whether an appropriate RTLS location service provider was selected. If not, then it can be assumed that an RTLS location service is likely not appropriate given current network circumstances. Therefore, at step 430, a GPS location service is activated at a GPS location service provider. For example, the SLC 105 activates a GPS location service at the SPC for GPS 145. However, if an appropriate RTLS location service provider was selected, then at step 435 the RTLS location service provider is activated. For example, the SLC 105 activates an RTLS location service at the SPC for RTLS 140.

Figure 5:
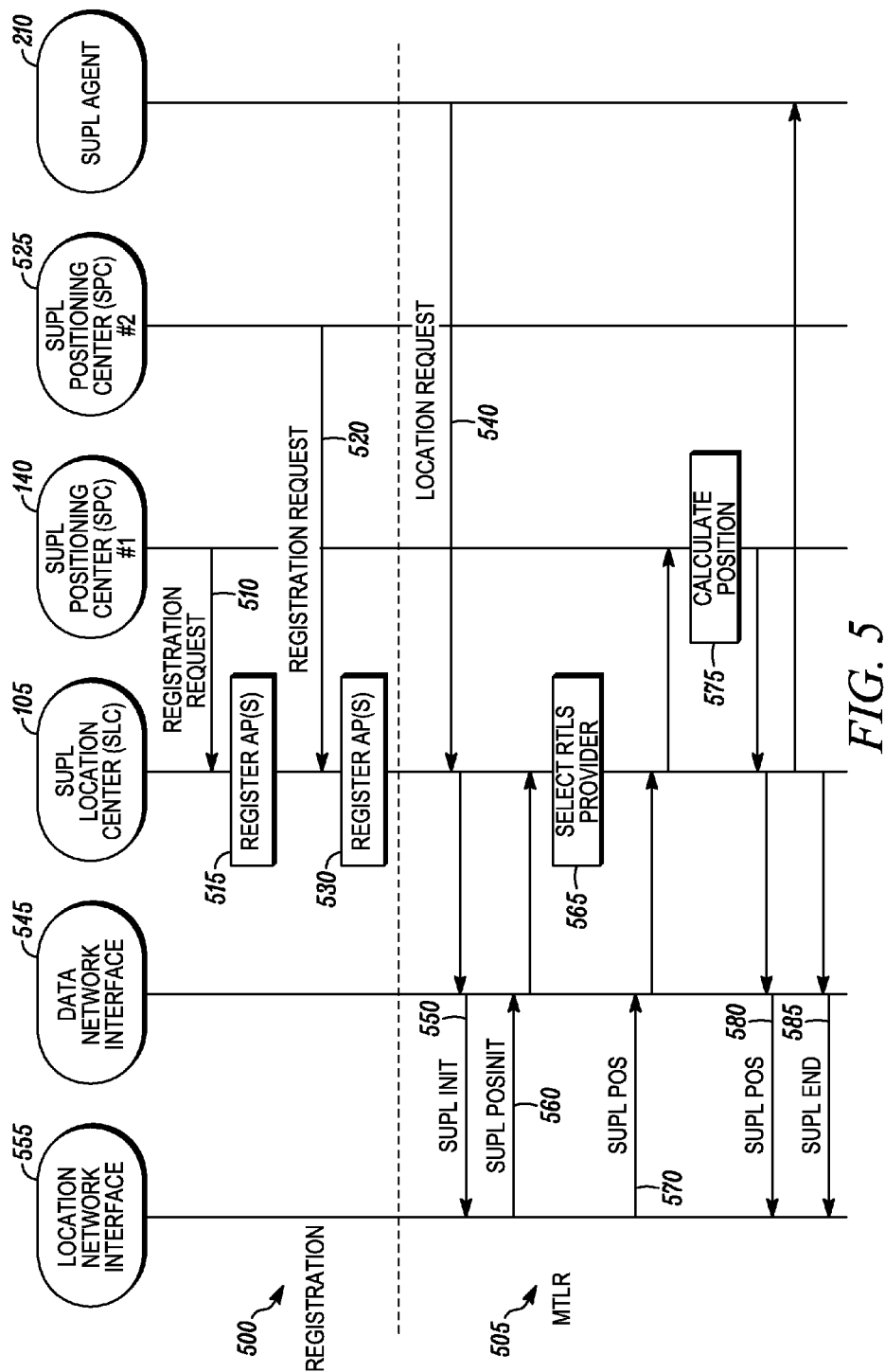
FIG. 5 is a message sequence chart illustrating a registration process and a mobile terminated location request (MTLR) positioning process, according to some embodiments of the present invention.

Referring to FIG. 5, a message sequence chart illustrates a registration process 500 and a mobile terminated location request (MTLR) positioning process 505 in the network 100, according to some embodiments of the present invention. During the registration process 500, the SPC for RTLS 140 transmits a registration request message 510 to the SLC 105. For example, the registration request message 510 is transmitted when the SPC for RTLS 140 is first powered on, and identifies all access points that are managed by the SPC for RTLS 140 and provides a position of each access point. If information concerning an access point changes, such as if an access point moves around or is disconnected from the network 100, then the registration request message 510 may comprise an update message. At block 515, access points identified in the registration request message 510 are registered at the SLC 105, such as in an RTLS affiliation table. Another registration request message 520 also is transmitted from an SPC 525 to the SLC 105 and, at block 530, access points identified in the registration request message 520 are registered at the SLC 105.

The MTLR positioning process 505 is initiated when a network user acting as the SUPL agent 210, such as a mobile telephone or other portable electronic device, transmits a location request message 540 to the SLC 105. The location request message 540 requests the current position of a target SUPL enabled terminal (SET), such as the mobile telephone 120 in the network 100, and may not specify what type of location services, such as RTLS or GPS services, should be used. Thus the type of location services used can be completely transparent to the SUPL agent 210. The SLC 105 then forwards the location request message 540 to a data network interface 545, which then transmits a SUPL initiation (INIT) message 550 to a location network interface 555. For example, the SUPL INIT message 550 may indicate that an RTLS process is preferred by including an rtlsSETassisted-Preferred value in a PosMethod field. The location network interface 555 then responds with a SUPL position initiation (POSINIT) message 560 including, for example, the following data: SETCapabilities{PosTechnology: rtls, PrefMethod: rtlsSETassistedPreferred, PosProtocol: rtls}; LocationID{RtlsApInformation{List of MAC addresses of Access Points}}, which is forwarded to the SLC 105. At block 565, the SLC 105 then selects a real time location service provider. For example, the SLC 105 uses the method 400 to select the SPC for RTLS 140 as an appropriate real time location service provider.

A SUPL positioning (POS) message 570 is then transmitted from the location network interface 555 to the SLC 105 through the data network interface 545. For example, the SUPL POS message 570 can include the following data: PosPayLoad: rtlsPayload(List of Quality, RSSI, Noise, networkID, baseStationID, MAC address). Based on the selection made at block 565, the SLC 105 then forwards the SUPL POS message 570 to the SPC for RTLS 140. At block 575, the SPC for RTLS 140 then calculates the position of the target SET, such as the mobile telephone 120.

Another SUPL POS message 580, including position data of the target SET, is then transmitted from the SPC for RTLS 140 to the SLC 105. For example, the SUPL POS message 580 can include the following data: PosPayLoad: rtlsPayload (Position). The SLC 105 then forwards the SUPL POS message 580 to the location network interface 555 and to the SUPL agent 210. Finally, the SLC 105 transmits a SUPL END message 585 to the location network interface 555 via the data network interface 545.

Figure 6:
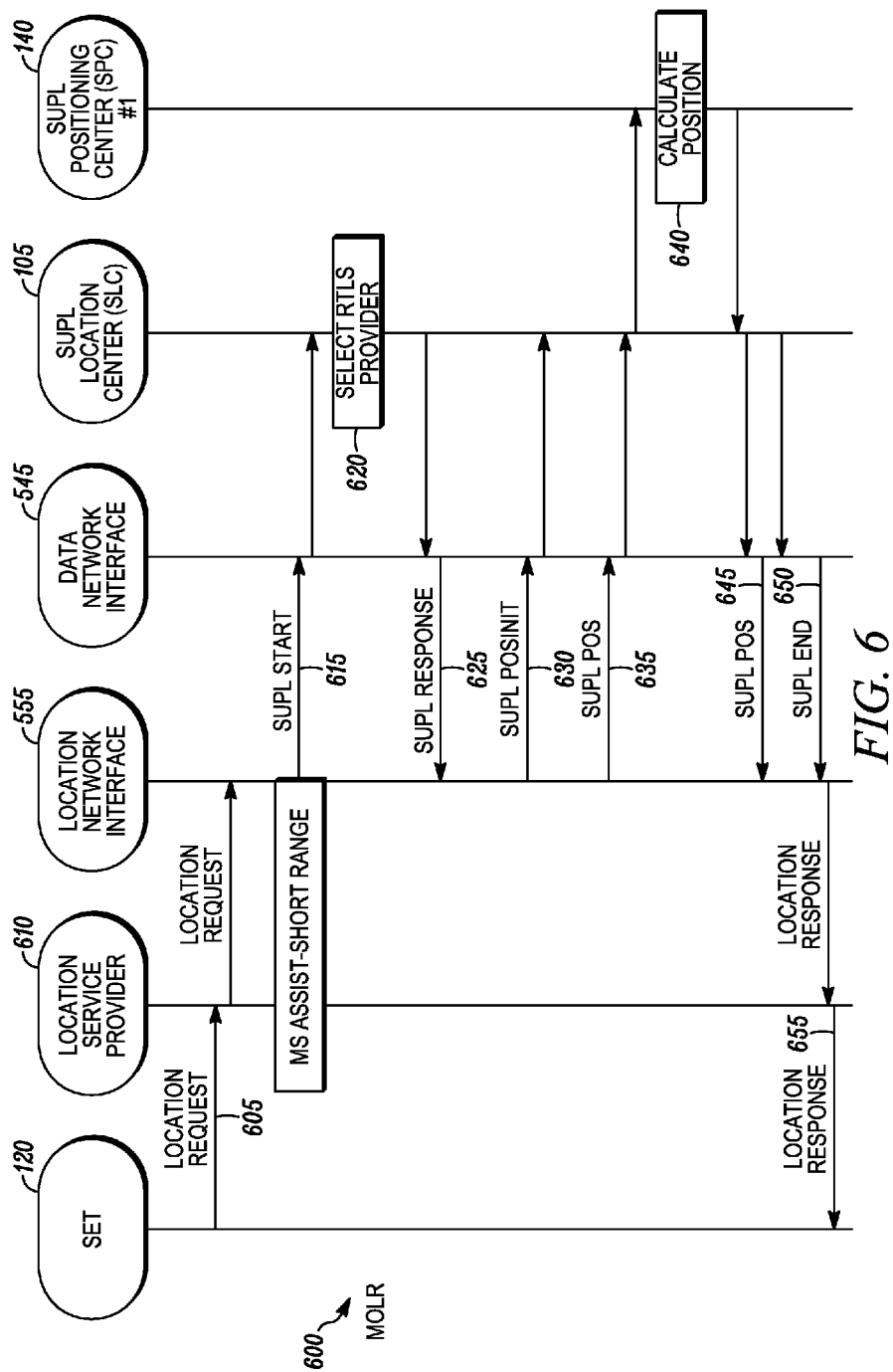
FIG. 6 is a message sequence chart illustrating a mobile originated location request (MOLR) positioning process, according to some embodiments of the present invention.

Referring to FIG. 6, a message sequence chart illustrates a mobile originated location request (MOLR) positioning process 600 in the network 100, according to some embodiments of the present invention. A location request message 605 is first transmitted from an SET, such as the mobile telephone 120, to a location service provider 610. The location request message 605, which may specify that no preference is given concerning a type of location service, is then forwarded to the location network interface 555. An SPL START message 615 is then transmitted to the SLC 105 via the data network interface 545. For example, the SUPL START message 615 may include the following data: SETCapabilities{PosTechnology: rtls, PrefMethod: rtlsSETassistedPreferred, PosProtocol: rtls}; LocationID{RtlsApInformation{List of MAC addresses of Access Points}}. At block 620, the SLC 105 then selects a real time location service provider. For example, the SLC 105 uses the method 400 to select the SPC for RTLS 140 as an appropriate real time location service provider.

A SUPL RESPONSE message 625 is then transmitted from the SLC 105 to the location network interface 555 through the data network interface 545. For example, the SUPL RESPONSE message 625 can include the following data: PosMethod: rtlsSETassistedPreferred. A SUPL POSINIT message 630, including data from the SUPL START message 615, is then transmitted from the location network interface 555 to the SLC 105 via the data network interface 545.

A SUPL POS message 635 is then transmitted from the location network interface 555 to the SLC 105 through the data network interface 545. For example, the SUPL POS message 635 can include the following data: PosPayLoad: rtlsPayload(List of Quality, RSSI, Noise, networkID, baseStationID, MAC address). Based on the selection made at block 620, the SLC 105 then forwards the SUPL POS message 635 to the SPC for RTLS 140. At block 640, the SPC for RTLS 140 then calculates the position of the mobile telephone 120.

Another SUPL POS message 645, including position data of the mobile telephone 120, is then transmitted from the SPC for RTLS 140 to the SLC 105. For example, the SUPL POS message 645 can include the following data: PosPayLoad: rtlsPayload(Position). The SLC 105 then forwards the SUPL POS message 645, followed by a SUPL END message 650, to the location network interface 555 via the data network interface 545. Finally, the location network interface 555 transmits a location response message 655 to the mobile telephone 120 via the location service provider 610.

Figure 7:
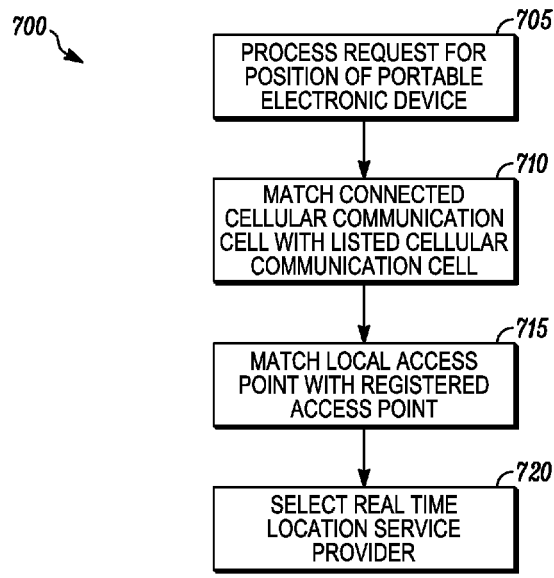
FIG. 7 is a general flow diagram illustrating a method for selecting a real time location service provider, according to some embodiments of the present invention.

Referring to FIG. 7, a general flow diagram illustrates a method 700 for selecting a real time location service provider, according to some embodiments of the present invention. At step 705, a request for a position of a portable electronic device is processed, where the request identifies at least one local access point and a connected cellular communication cell to which the device is operatively connected. The request for a position of the portable electronic device may further identify a plurality of local access points and received signal strength values of signals received at the portable electronic device from each local access point in the plurality of local access points. Further, matching the at least one local access point with at least one access point in the plurality of registered access points associated with the available cellular communication cell, can comprise matching the plurality of local access points with access points in the plurality of registered access points.

At step 710, the connected cellular communication cell is matched with a listed cellular communication cell, where the listed cellular communication cell is associated with the real time location service provider and with a plurality of registered access points.

At step 715, the at least one local access point is matched with at least one registered access point in the plurality of registered access points.

At step 720, the real time location service provider is selected based on an association of the at least one registered access point with the real time location service provider.

Figure 8:
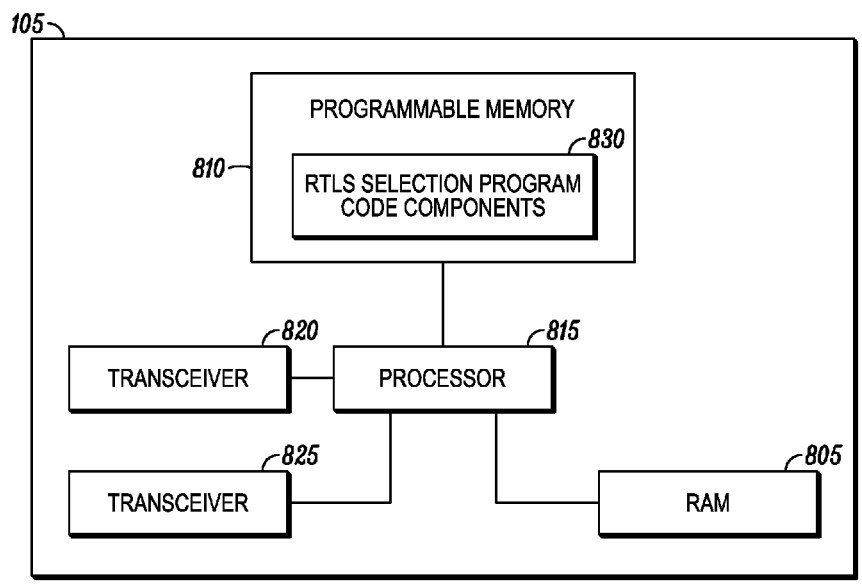
FIG. 8 is a block diagram illustrating components of a SUPL Location Center (SLC), according to some embodiments of the present invention.

Referring to FIG. 8, a block diagram illustrates components of the SUPL Location Center (SLC) 105, according to some embodiments of the present invention. The SLC 105 comprises a random access memory (RAM) 805 and a programmable memory 810 that are coupled to a processor 815. The processor 815 also has ports for coupling to transceivers 820, 825. The transceivers 820, 825 can be used to enable the SLC 105 to communicate with other network devices, such as the mobile telephones 115, 120 or the WiFi/WIMAX AP 150, that operate using various communication technologies, protocols and frequencies. For example, the transceiver 820 can be used to communicate with the mobile telephones 115, 120 using a global system for mobile (GSM) or code division multiple access (CDMA) technology; whereas the transceiver 825 can be used to communicate with the WiFi/WIMAX AP 150 using a WiFi or WIMAX technology.

The programmable memory 810 can store operating code (OC) for the processor 815 and code for performing functions associated with a SUPL location center. For example, the programmable memory 810 can comprise RTLS selection computer readable program code components 830 configured to cause execution of a method for selecting a real time location service provider as described herein.

Advantages of the present invention thus include enabling a location center such as a SUPL Location Center (SLC) to function as a proxy server to select an appropriate location service provider, such as an RTLS provider or a GPS location services provider. Selection of an appropriate location service provider can be seamless from the perspective of end users, can increase available location services (LCS) technologies and can improve positioning accuracy. Also, use of a SUPL SLC as a proxy server does not require portable electronic devices that move around a network to maintain internet protocol (IP) addresses and locations of individual location servers. Further, if a position of a portable electronic device cannot be fixed by either an RTLS provider or a GPS location services provider, a position estimate of the device still can be obtained from a location center using received signal strength values concerning local access points.

It will be appreciated that embodiments of the invention described herein may be comprised of one or more conventional processors and unique stored program instructions that control the one or more processors to implement, in conjunction with certain non-processor circuits, some, most, or all of the functions of selecting a real time location service provider as described herein. The non-processor circuits may include, but are not limited to, a radio receiver, a radio transmitter, signal drivers, clock circuits, power source circuits, and user input devices. As such, these functions may be interpreted as steps of a method for selecting a real time location service provider. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

We claim:

1. A method for selecting a real time location service provider, the method comprising:
processing a request for a position of a portable electronic device, where the request identifies at least one local access point and a connected cellular communication cell to which the device is operatively connected;
matching the connected cellular communication cell with a listed cellular communication cell, where the listed cellular communication cell is associated with the real time location service provider and with a plurality of registered access points;
matching the at least one local access point with at least one registered access point in the plurality of registered access points; and
selecting the real time location service provider based on an association of the at least one registered access point with the real time location service provider.

2. The method of claim 1, wherein the request for a position of the portable electronic device further identifies a plurality of local access points and received signal strength values of signals received at the portable electronic device from each local access point in the plurality of local access points.

3. The method of claim 2, wherein the received signal strength values are used to identify a position of the portable electronic device when the real time location service provider is unable to fix a location of the portable electronic device.

4. The method of claim 2, wherein matching the at least one local access point with at least one access point in the plurality of registered access points associated with the available cellular communication cell comprises matching the plurality of local access points with access points in the plurality of registered access points.

5. The method of claim 1, wherein the method is performed at a Secure User Plane Location Center.

6. The method of claim 5, wherein the Secure User Plane Location Center functions as a proxy server between a Secure User Plane Location Positioning Center for real time location services and a Secure User Plane Location Positioning Center for Global Positioning System services.

7. The method of claim 1, wherein the real time location service provider is a Secure User Plane Location Positioning Center for real time location services.

8. The method of claim 7, wherein a Secure User Plane Location Platform comprises the Secure User Plane Location Positioning Center for real time location services.

9. The method of claim 1, wherein in the method is performed in response to a Mobile Terminated Location Request.

10. The method of claim 1, wherein the method is performed in response to a Mobile Originated Location Request.

11. The method of claim 1, wherein the method is performed in response to a Network Initiated Location Request.

12. The method of claim 1, wherein the method conforms to an Open Mobile Alliance Secure User Plane Location standard.

13. A Secure User Plane Location Center comprising:
a computer processor;
a computer-readable memory;
the memory storing instructions executable by the processor to cause:
processing a request for a position of a portable electronic device, where the request identifies at least one local access point and a connected cellular communication cell to which the device is operatively connected;
matching the connected cellular communication cell with a listed cellular communication cell, where the listed cellular communication cell is associated with the real time location service provider and with a plurality of registered access points;

matching the at least one local access point with at least one registered access point in the plurality of registered access points; and selecting the real time location service provider based on an association of the at least one registered access point with the real time location service provider.

14. The Secure User Plane Location Center of claim 13, wherein the request for a position of the portable electronic device further identifies a plurality of local access points and received signal strength values of signals received at the portable electronic device from each local access point in the plurality of local access points.

15. The Secure User Plane Location Center of claim 14, wherein the received signal strength values are used to identify a position of the portable electronic device when the real time location service provider is unable to fix a location of the portable electronic device.

16. The Secure User Plane Location Center of claim 14, wherein matching the at least one local access point with at least one access point in the plurality of registered access points associated with the available cellular communication cell comprises matching the plurality of local access points with access points in the plurality of registered access points.

17. The Secure User Plane Location Center of claim 13, wherein the Secure User Plane Location Center functions as a proxy server between a Secure User Plane Location Positioning Center for real time location services and a Secure User Plane Location Positioning Center for Global Positioning System services.

18. The Secure User Plane Location Center of claim 13, wherein the real time location service provider is a Secure User Plane Location Positioning Center for real time location services.

19. The Secure User Plane Location Center of claim 13, wherein the Secure User Plane Location Center conforms to an Open Mobile Alliance Secure User Plane Location standard.

20. An apparatus for selecting a real time location service provider, the apparatus comprising:

means for processing a request for a position of a portable electronic device, where the request identifies at least one local access point and a connected cellular communication cell to which the device is operatively connected;

means for matching the connected cellular communication cell with a listed cellular communication cell, where the listed cellular communication cell is associated with the real time location service provider and with a plurality of registered access points;

means for matching the at least one local access point with at least one registered access point in the plurality of registered access points; and means for selecting the real time location service provider based on an association of the at least one registered access point with the real time location service provider.

* * * * *